Figure 1:
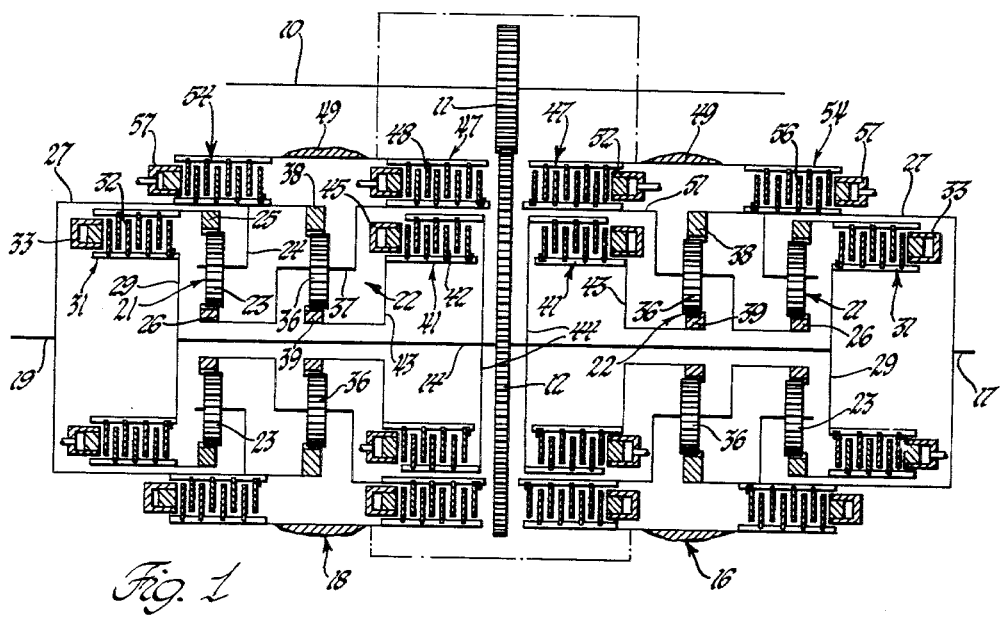

May 31, 1966   W. G. LIVEZEY   3,253,688
TRANSMISSION
Filed Nov. 28, 1962

INVENTOR.
William G. Livezey
BY
A. M. Neiter
ATTORNEY

United States Patent Office 3,253,688
Patented May 31, 1966

3,253,688
TRANSMISSION
William G. Livezey, Indianapolis, Ind., assignor to General Motors Corporation, Detroit, Mich., a corporation of Delaware
Filed Nov. 28, 1962, Ser. No. 240,559
4 Claims. (Cl. 192—87)

This invention relates to transmissions and particularly to cross drive transmissions providing a plurality of straight drives and a plurality of steering drives.

These cross drive transmissions provide both clutch brake steering for sharp turns and geared steering for gradual turns and two speeds forward and a reverse drive. The cross drive units have forward and reverse gearing to provide forward and reverse drive and low and high ratios to provide low and high ratio drive. In one form of the invention the input driven cross shaft drives each output shaft through a similar gear unit. In each gear unit the cross shaft drives, through a clutch, the ring gear of the forward drive planetary gear set. The carrier of this planetary gear set is connected to the transmission output. The sun gear is connected to the carrier of the reverse gear set and a brake. The sun gear of the reverse planetary gear set may be connected to the input driven cross shaft to drive the ring gear, which is connected to output, for reverse drive.

Geared steer may be provided by engaging one ratio in one unit and the other ratio in the other unit. Clutch brake steer may be provided by disconncting the drive in one unit and engaging the brake for that unit. Pivot steer or the equivalent may be provided by engaging reverse in one unit and forward in the other unit. For straight drive low and high ratio forward drive and one reverse ratio is provided.

In another form of the invention, the input is connected by selectively engageable forward and reverse drive trains to drive the cross shaft which is connected by a forward gear set to each of the output shafts. In each gear unit the cross shaft drives the ring gear of the gear set and the carrier is connected to the output. The sun gear is either retarded or clutched to the output to provide respectively a low ratio and a higher ratio or direct drive. In this arrangement, low in one unit may be engaged with high of the other unit to provide geared steer. Also, the drive in one gear unit may be disconnected and the vehicle brake applied for clutch brake steer. Forward or reverse drive may be selectively provided by engaging the forward or reverse clutches and in conjunction with the low and high ratio engaging devices in the forward drive unit, a low and a high ratio may be provided in either forward and reverse.

The forward and reverse clutches are actuated by a single piston dividing a cylinder into two apply chambers. Belleville return springs are employed in each chamber and arranged so that only one spring acts at a time to provide positive centering. The springs are pinned to the piston and cylinder to cause these parts to rotate together. A gear is cut on the external perimeter of the piston to provide a supply pump drive.

An object of the invention is to provide a simple cross drive transmission arrangement for selective operation in either of two forward speeds or a reverse speed and for steering drives providing geared steering and clutch brake steering.

Another object of the invention is to provide a cross drive transmission having a cross shaft driving a pair of gear units connected to the output shaft with each gear unit providing low and high speed forward drive and reverse drive to provide in straight drive two speeds forward and one speed reverse and geared, clutch brake and pivot steering drives.

Another object of the invention is to provide in a cross drive transmission an input driving through selectively engageable forward and reverse gear trains to drive a cross shaft and a pair of low and high ratio gear units connecting the cross shaft to each of the output shafts to provide two speeds forward and two speeds reverse for straight drive and geared and clutch brake steering drives.

Another object of the invention is to provide in a transmission having a pair of clutches a single piston for actuating both clutches located in a cylinder and having retraction springs operative selectively to provide positive centering.

These and other objects of the invention will be more apparent from the following description and drawings of the preferred embodiments of the invention.

FIGURE 1 schematically shows a cross drive transmission.

Figure 2:
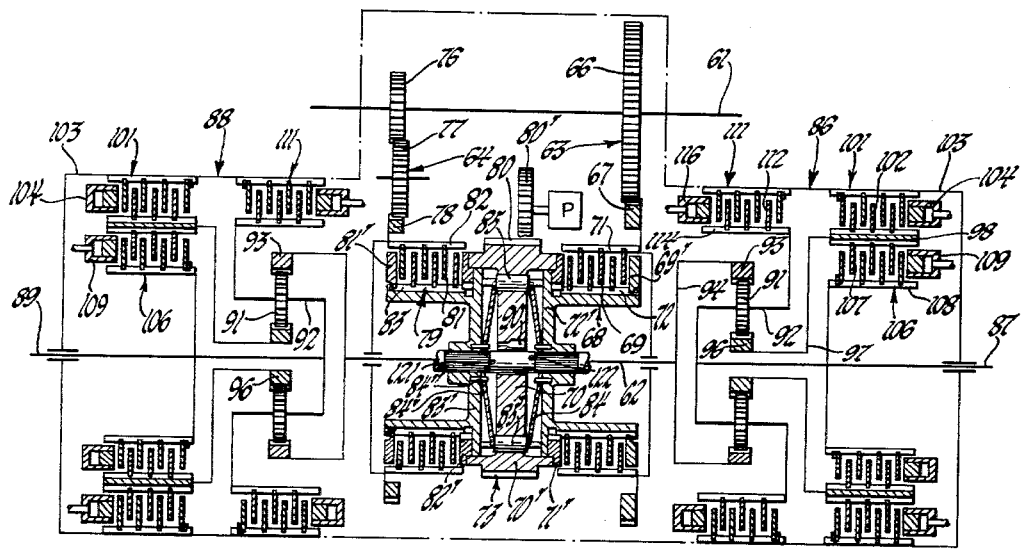

FIGURE 2 schematically shows a modified cross drive transmission.

The invention is illustrated in a cross drive transmission in FIGURE 1 having an input or transfer shaft 10 rotatably mounted in the fixed housing and driving an input gear 11 meshing with the spur gear 12 fixed on the cross shaft 14. The cross shaft 14 is connected by a right gear unit 16 to drive the right output shaft 17 and also drives through an identical left gear unit 18 the left output shaft 19.

Since the right and left gear units are similar, the following description applies to each gear unit. Each gear unit has a forward drive planetary gear set 21 and a reverse drive planetary gear set 22. The forward drive planetary gear set 21 has planetary pinions 23 mounted on a carrier 24 and meshing with the ring gear 25 and a sun gear 26. The carrier 24 is drivingly connected to a rotary output housing 27 which is connected to drive the output shaft 17 or 19. The cross shaft 14 is connected by an input hub 29 and a forward clutch 31 to the ring gear 25. The clutch 31 consists of a plurality of plates 32 alternately splined to the hub 29 and the drum portion of ring gear 25 and a fluid motor 33 having a conventional piston and cylinder rotating with the clutch assembly 31.

The reverse gear set 22 has a plurality of planetary pinions 36 mounted on a carrier 37 connected to the sun gear 26 of the forward drive gear. The pinions mesh with the ring gear 38 fixed to the output housing 27 and a sun gear 39. The sun gear 39 is connected by the reverse clutch 41 to the cross shaft 14. The reverse clutch has a plurality of friction plates 42 alternately connected to the sun gear hub and drum 43 and the cross shaft hub and drum 44 and a fluid motor 45 having a piston and cylinder rotating with the clutch assembly for engaging the clutch. The carrier 37 is connected by a reaction brake 47 to the vehicle frame. The reaction brake includes a plurality of friction plates 48 alternately splined to the housing 49 and a drum 51 connected to the carrier 37, and a fluid motor having a piston and cylinder fixed on the stationary housing operable to engage the brake plates to engage the brake. The vehicle brake 54 consists of a plurality of plates 56 alternately splined to the output housing 27 and the transmission stationary housing 49 which are actuated by a motor 57 consisting of a piston and cylinder.

The cross drive transmission unt is operated to provide straight forward drive in either low, high or reverse drives and a positive neutral. For forward drive the input clutch 31 is engaged to provide an input drive to the ring gear 25 of the forward drive gear set 21, and the reaction brake 47 is engaged to hold the sun gear 26 to provide low drive. The higher ratio or direct drive is provided by engaging the input clutch 31 to provide an input via ring gear 25 to the forward reaction gear set 21 and by engaging the reverse clutch 41 to provide an input to the sun gear 39 of the reverse planetary gear set 22 to lock up the gear unit for direct drive. For reverse drive the forward clutch 31 is disengaged and the reverse clutch 41 is engaged to provide an input drive to the sun gear 39. When the reaction brake 47 is engaged to hold the carrier 37, there is a reverse drive to the ring gear 38 and output housing 27 to drive either output shaft. In neutral, the reaction brake may remain engaged and still provide a positive neutral. These drives are summarized in the following table.

|  | Brake 47 | Clutch 41 | Clutch 31 |
| --- | --- | --- | --- |
| Low | X |  | X |
| High |  | X | X |
| Reverse | X | X |  |
| Neutral | X |  |  |

The steering drives are provided by changing the drives in one of the units with respect to the drive in the other of the units. Thus, for example, right geared steer may be provided by engaging high ratio in the left unit and low ratio in the right unit. Clutch brake steer to the right may be obtained by engaging either low or high ratio in the left unit and providing neutral in the right unit and engaging the right brake 54. A substantially pivot steer may be obtained, for example, for steering to the right, by engaging low forward drive in the left unit and reverse drive in the right unit. This will provide an effective pivot steer even though the low ratio and the reverse ratio is not exactly the same.

A modified form of cross drive transmission is shown in FIGURE 2. The input or transfer shaft 61 is connected to the cross drive shaft 62 to provide rotation in opposite directions selectively by either the forward drive train 63 or the reverse drive train 64. The forward drive train 63 has a gear 66 driven by input shaft 61 to drive the gear 67 which is rotatably mounted on shaft 62 or the housing and connected by the forward clutch 68 to the cross shaft 62. The clutch 68 has a plurality of plates 69 with alternate plates splined to a drum 71 connected to the gear 67 and intermediate plates splined to a drum 72 mounted on the annular end wall 72' of the cylinder of double acting motor 73. The end wall 72' is splined for rotation with and fixed to cross shaft 62. The reverse gear train 64 has a gear 76 driven by the input shaft 61, which drives through an idler gear 77 rotatably mounted on the housing, the gear 78 which is rotatably mounted on shaft 62. Gear 78 is connected by clutch 79 to the cross shaft 62. The clutch 79 has plates 81 with alternate plates connected to a drum 82 fixed to gear 78 and intermediate plates splined to a drum 83 connected to the annular end wall 83' of the cylinder of the double acting motor 73. The end wall 83' is fixed to cross shaft 62.

The output drums 72 and 83 of each clutch have fixed respectively thereto a fixed backing plate 69' and 81'. The motor 73 has a central annular piston 70 located between the annular end walls 72' and 83' of the cylinder. The shaft 62 passes through the central aperture of the piston 70 and is sealed thereto. The piston 70 has a peripheral head portion 70' forming the outer cylindrical portion of the cylinder and engaging in sliding sealing relationship with the outer perimeter of the fixed cylinder end walls 72' and 83'. The cylinder head 70' has end portions abutting the forward clutch packing plate 71' which is slidably splined to the drum 72. At the other side the head 70' abuts the packing plate 82' which is slidably splined to the drum 83. On each side of the piston 70 there is an apply chamber for the clutch located on the opposite side of the piston. There is a spring 84 in the reverse apply chamber and a spring 84' in the forward clutch apply chamber. At the inner perimeter of both of these Belleville springs there are pins 84" located in the wall 72' and engaging a slot or aperture in the adjacent portion of the spring 84 and similar pins 84" in end wall 83' engaging slots in the spring 84' to cause both springs to rotate with the piston end walls and the shaft 62. One or more struts 85 acting as a stop means are slidably mounted in suitable apertures in the piston 70. The struts 85 have a central enlargement 85' having a length slightly longer than the width of the piston 70 to provide shoulder surfaces at this point. The thinner extended portion of the strut 85 passes through suitable slots in the outer perimeter of the Belleville springs 84 and 84' to cause the piston 70 to rotate with the Belleville springs and thus the shaft 62. It will also be noted that the full length of the strut is equal to the distance between the cylinder end walls 72' and 83' which locates these struts in a fixed axial position. The piston head 70' has an external gear 80 meshing with the gear 80' driving a pump P which may be employed to supply control or cooling fluid to the transmission system.

The cross shaft 62 is connected by a right gear unit 86 to the right output shaft 87 and by similar left gear unit 88 to the left output shaft 89. Since the gear units are similar the following description applies to both gear units. The gear units have a planetary gear set consisting of a plurality of planetary pinions 91 mounted on a carrier 92 connected to drive the output shaft 87 or 89. The pinions mesh with a ring gear 93 connected by housing 94 to the cross shaft 62 and with a sun gear 96 connected to a control hub 97 and drum 98. The sun gear 96 is held by a reaction brake 101 having a plurality of plates 102 with alternate plates splined to the control drum 98 and intermediate plates splined to stationary housing 103 and a fluid motor 104 to supply the fluid to engage the reaction brake to retard the sun gear for low speed forward drive. The clutch 106 locks up the gear unit for direct drive. The clutch has a plurality of plates 107 with alternate plates splined to the control drum 98 and intermediate plates splined to the output drum 108 which is drivingly connected to the output shaft 87 and has a fluid motor 109 which is supplied with fluid to engage the clutch to hold the sun gear 96 for rotation with the output shaft 87 to lock up the planetary gear unit for the higher or direct drive. The vehicle brake 111 has a plurality of plates 112 with alternate plates splined to the fixed transmission housing 103 and intermediate plates splined to the brake drum 114 which is drivingly connected through the carrier 92 to the output shaft 87 or 89. The brake also includes a fluid motor 116 to apply the friction plates to engage the brake and retard the output shaft 87.

Forward and reverse drive is selectively provided by selectively engaging respectively the forward clutch 68 and the reverse clutch 79. In either forward or reverse drive, low or direct drive ratio may be engaged by selectively engaging the reaction brake 101 or the direct drive clutch 106 respectively. Thus in both forward and reverse drives two speed ratios may be provided. Geared steering may be provided, for steering to the right for example, by maintaining high ratio engaged in the left unit by the engagement of clutch 106 and engaging reaction brake 101 in the right unit to provide the low ratio drive in the right unit. Clutch brake steering may be provided, to the right for example, by disengaging both the reaction brake 101 and the clutch 106 to place the gear unit in neutral condition and engaging the vehicle brake 111 to retard the right output shaft 87.

In FIGURE 2 the double acting fluid motor 73 is employed to actuate both the forward clutch 68 and the reverse clutch 79. When fluid is supplied via line 121 it enters the forward apply chamber between the cylinder end wall 83' and the piston 70 to move the piston to the right moving the forward clutch pressure plate 71' to engage the plates. When fluid is supplied from line 121 to the forward apply chamber a portion of the fluid is bled through the orifice passage 90 through the piston 70 to the reverse apply chamber to keep the reverse apply chamber filled with fluid. Since the reverse apply chamber is connected to exhaust, via line 122 at this time the pressure in the reverse apply chamber will be zero at the inner diameter and gradually increased due to the centrifugal pressure head to balance the centrifugal pressure head force caused by the fluid in the apply chamber to assist in centering or returning the piston. As the piston 70 moves to the right, the strut 85 remains stationary and the spring 84' rests against the shoulder of portion 85' of the strut and does not act on the piston. The piston 70 abuts the spring 84 and moves it off the shoulder of the strut portion 85' to tension the spring to provide a retraction force. When fluid is supplied by the reverse apply line 122 to the reverse chamber containing spring 84, the piston is moved to the left. The forward chamber is similarly kept filled with fluid by orifice passage 90. Spring 84 does not act on the piston while spring 84' provides the return force.

The clutch and brake units each have a fluid motor consisting of a piston and a cylinder and retraction springs. The cylinders of the brakes are fixed on the transmission housing and those of the clutches rotate with one of the connected members. When fluid is supplied to a motor the plates are engaged to engage the brake or clutch. These fluid actuated friction torque establishing devices are employed to lock up a gear unit, to hold a gear unit reaction member and to brake the output shaft.

The above described preferred embodiments are illustrated in the invention and are subject to modification within the terms of the appended claims.

I claim:

1. In a transmission; an output shaft; a pair of input gears rotatably mounted coaxially with said output shaft; a pair of clutches located between said input gears; each clutch having an input drum connected to one of said gears, an output drum connected to said output shaft and a plurality of clutch plates between said input and output drums; a pair of spaced annular cylinder end walls located between said clutches coaxial and rotating with said output shaft; a piston located between said annular end walls having a disc portion between said end walls and a transverse cylindrical head portion extending on both sides of the piston portion and contacting the outer perimeter of each of said annular end walls to provide an apply chamber on each side of said piston; spring means on each side of said piston operatively connected between said piston and cylinder walls for biasing the piston from any position on one side of a neutral position to said neutral position; strut means fitting between said cylinder end walls and arranged between both said spring means providing shoulder surfaces spaced slightly further apart than the corresponding points of spring means engagement with said piston whereby said spring means engages said shoulder surfaces and are held out of prestressed piston engagement when said piston has been moved to said neutral position; means connecting said piston and cylinder walls to rotate said piston and cylinder walls together; and power take-off means connected to the external perimeter of said piston.

2. The invention defined in claim 1 and each of said output drums being connected to said output shaft by an annular cylinder end wall.

3. In a transmission; a drive shaft; a pair of drive members rotatably mounted coaxially with said drive shaft; a pair of clutches located between said drive members and each clutch connected between a drive member and said drive shaft; a pair of spaced annular cylinder end walls located between said clutches and rotatable with said drive shaft; piston means located between said annualar end walls for providing an apply chamber on each side of said piston; and spring means on each side of said piston operatively connected between said piston and cylinder walls for biasing the piston from any position on one side of a neutral position to said neutral position and stop means fitting between said cylinder end walls to prevent axial movement having shoulder surfaces spaced slightly wider than said piston means in the area of engagement by said spring means to limit movement of said spring means as said piston means is moved to a neutral position and to hold said spring means out of prestressed piston engagement in said neutral position.

4. In a transmission; an output shaft; a pair of input gears rotatably mounted coaxially with said output shaft; a pair of clutches located between said input gears; each clutch having an input drum connected to one of said gears, an output drum connected to said output shaft and a plurality of clutch plates between said input and output drums; a pair of spaced annular cylinder end walls located between said clutches coaxial and rotating with said output shaft; a piston located between said annular end walls having a disc portion between said end walls and a transverse cylindrical head portion extending on both sides of the piston portion and contacting the outer perimeter of each of said annular end walls to provide an apply chamber on each side of said piston; spring means on each side of said piston operatively connected between said piston and cylinder walls and operative to bias the piston from any position on one side of the neutral position to said neutral position but inoperative to bias the piston past said neutral position; means connecting said piston and cylinder walls to rotate said piston and cylinder walls together; power take-off means connected to the external perimeter of said piston; and said spring means including a Belleville spring on each side of said piston, each spring abutting one of said cylinder end walls and said piston; a strut fitting between said cylinder end walls to prevent axial movement and passing through an aperture in said piston and shoulder means on said strut limiting movement of each spring as it engages the piston to move it toward the neutral position at the neutral position to prevent further movement.

References Cited by the Examiner

UNITED STATES PATENTS

| | | | |
|---|---|---|---|
| 1,424,446 | 8/1922 | Buckendale | 74—720.5 |
| 2,088,110 | 7/1937 | Lamb | 74—720.5 |
| 2,272,934 | 2/1942 | Cotal | 74—720.5 |
| 2,488,540 | 11/1949 | Hollingsworth | 192—87 |
| 2,600,043 | 6/1952 | Armitage et al. | 192—87 |
| 2,844,043 | 7/1958 | Hobbs | 192—87 |
| 2,912,884 | 11/1959 | Christenson et al. | 74—720.5 |
| 2,979,176 | 4/1961 | Voth | 192—87 |
| 3,039,327 | 6/1962 | Breting | 74—720.5 |
| 3,040,408 | 6/1962 | Schou | 192—87 |
| 3,054,491 | 9/1962 | Bloch et al. | 192—87 |
| 3,075,408 | 1/1963 | Chapman et al. | 74—720.5 X |
| 3,095,764 | 7/1963 | Peras | 74—763 |

DAVID J. WILLIAMOWSKY, *Primary Examiner.*

DON A. WAITE, *Examiner.*

T. C. PERRY, *Assistant Examiner.*